United States Patent Office 3,254,924
Patented June 7, 1966

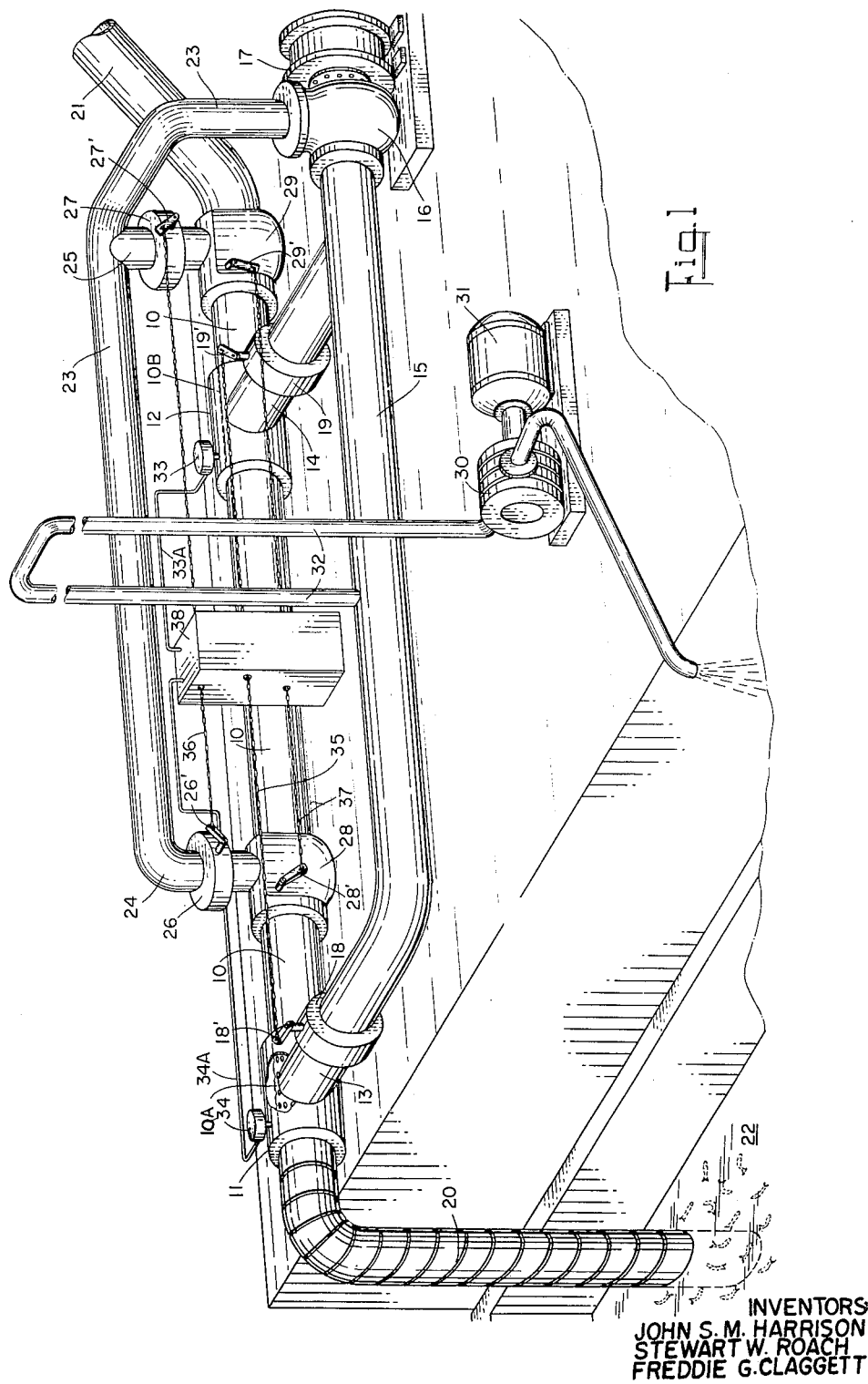

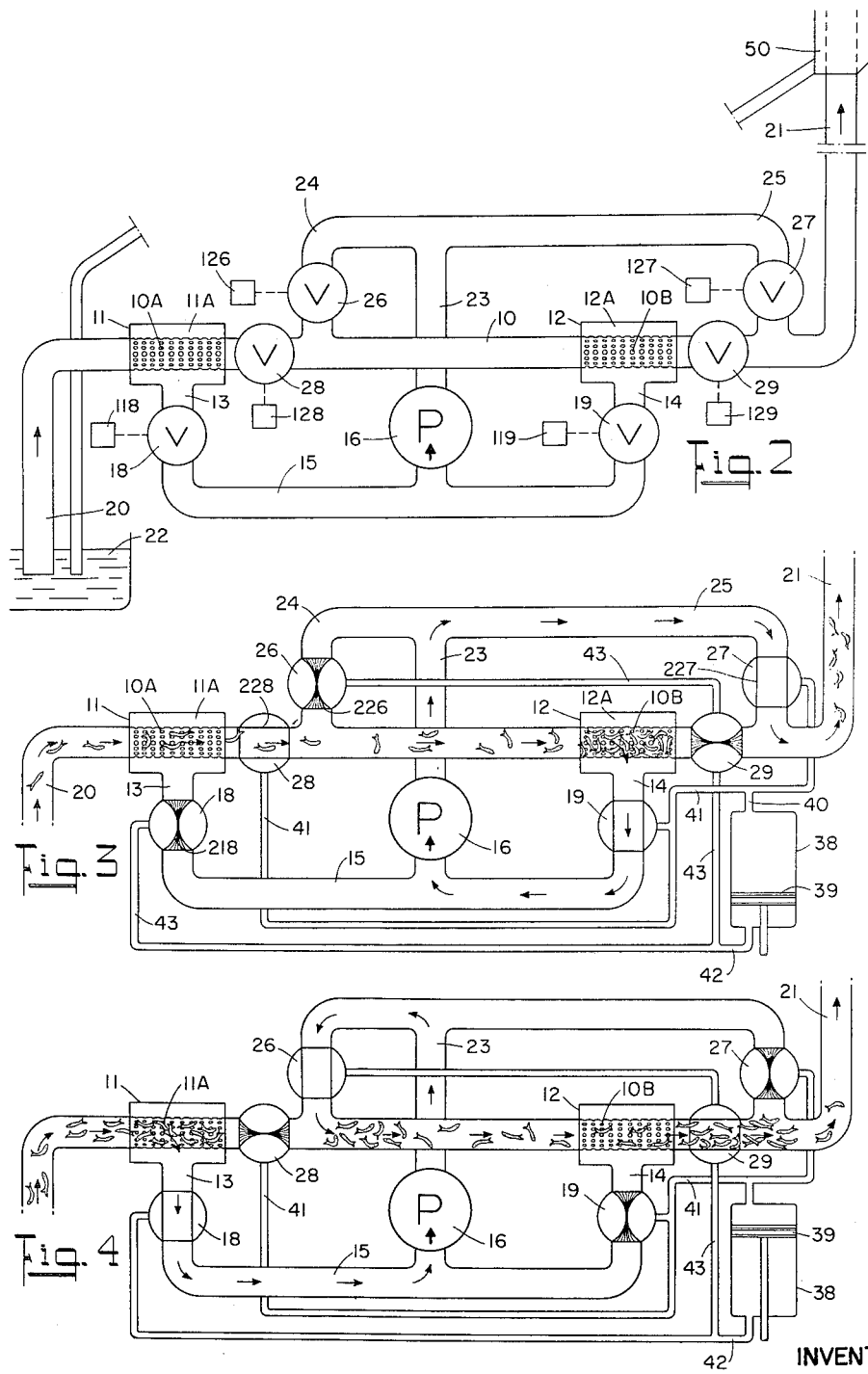

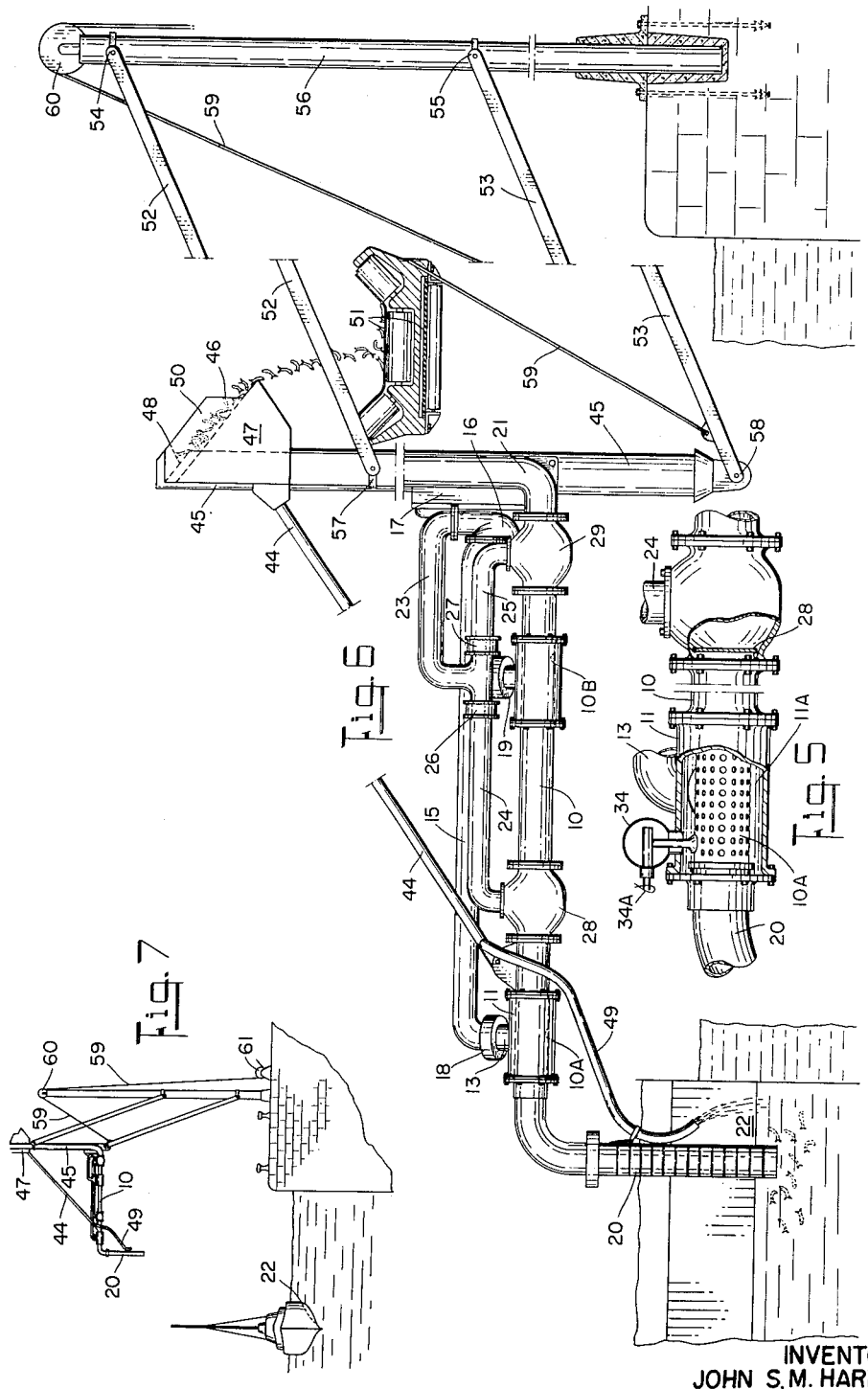

3,254,924
HYDRAULIC APPARATUS FOR TRANSFER OF
FISH AND THE LIKE WITHOUT SHOCK
John Stanley Milton Harrison, 1090 Aubeneau Crescent;
Stewart Williard Roach, 1170 Queens Ave.; and Freddie Gene Claggett, Suite 5, 1371 W. 71st Ave., all of
West Vancouver, British Columbia, Canada
Filed July 13, 1964, Ser. No. 382,140
8 Claims. (Cl. 302—14)

This invention relates to the handling of materials in conduits, and particularly concerns the transport of solids entrained in fluids by pumping systems employing novel pipe and valve arrangements.

Known elevating means have not proven altogether satisfactory in the handling of irregularly shaped solids, particularly materials of elongate form which may easily be damaged by impact or abrasion. As one example, the unloading of fish from holds of fishing vessels and their transfer to an elevated receiving point at a processing station is now generally effected by some form of mechanical elevator such as slatted belts, chains and buckets, or by conventional pumps and pipelines. All of these inflict damage of varying severity on the products as well as being awkward to use.

A handling system has long been much desired which would be capable of unloading mixed sizes of fish from the holds of vessels, in whose operation a high transport rate would be combined with convenience and speed of setting into position while assuring freedom from marring of the product. In many other handling operations a similar need has existed for gentle movement of fluid-entrained solids which can be flowed in a conduit, particularly to effect transfer and elevation of such solids from open storage tanks or reservoirs to a receiving point, and adapted to discharge against a pressure head. In such operations it has been recognized that the solids should not be subjected to impacts by impeller blades or to abrasion by reason of strong turbulence in the mixture such as is produced by impinging high velocity jets.

We now provide an improved pumping system for the transport of entrained solids including fish bodies and the like, in which a valved conduit is extended between an open container and an elevated discharge point and comprises an elongate tubular loading chamber connected between an intake pipe and a discharge conduit, whose free ends respectively connect with a mixture of solids and water and with a discharge receiving means, together with associated pumping means operable in a first cycle to draw entrained solids and water through the intake pipe into the loading chamber while withdrawing water only through a screen-wall portion of the chamber and operable in a second cycle to force the contents of the chamber out along the discharge conduit to a discharge point, while maintaining a steady withdrawal of entrained solids from the storage container and a steady discharge of water and/or water and solids through the discharge conduit.

In our improved system we also provide a fluid separator at the discharge point which returns excess water to the container, when delivery of concentrated solids is desired. We also provide a parallelogram linkage type of support frame operable to lower the novel pumping system as a unit into a position suitably near to or within a ship's hold and which may be readily lifted when unloading is completed into a raised storage position out of the way while the ship clears the dock.

In the operation of our systems, a high volumetric rate pump is employed to withdraw water or other entraining fluid from a reservoir through either of a pair of spaced screen-wall portions formed in the wall of the loading chamber at opposite ends of the chamber, by way of suction branch lines selectably connectable with the pump intake by opening or closing valves therein, while water is discharged from the output side of the pump into the conduit through pressure branch lines entering the conduit at points spaced to that side of the screen wall portions remote from the supply, and which are selectively connectable with the pump discharge by opening or closing valves in the pressure branch lines, and unidirectional movement of water or fluid with entrained solids in the loading chamber being provided by check valves placed between each screen wall portion and the joints connecting the pressure branch lines with the chamber.

It is an essential feature of the operation of our improved pumping system that not only is solid material prevented from passing through the pump, but flow of fluid along the discharge conduit is substantially steady.

In a preferred embodiment according to the invention, the entrained solids and water are drawn up from an open reservoir into the intake pipe and, in a first operating cycle, are also drawn into the loading chamber by suction applied to remove water alone through the screen-wall portion furthest from the reservoir while water only is discharged from the pump through the pressure branch line furthest from the reservoir, and on out along the discharge conduit. When the loading chamber is filled to the desired degree, as may be made evident by a predetermined pressure difference between the operating suction branch and the internal chamber pressure, the valves are operated to their alternate positions, to initiate a second operating cycle. In the second cycle the entrained solids are drawn into the intake tube and water is withdrawn through the screen-wall portion nearest the reservoir, while the discharge of the pump is admitted through the pressure branch line nearest the supply to force the contents of the chamber out along the discharge conduit until the pressure difference between the operating suction branch and the intake pipe indicates a desired loading has been reached. Thereupon, the valves revert to their original positions and the first cycle is repeated, so that continuous automatic operation is carried out under control of the density of solids in the loading chamber.

The operation may also be carried out on a time-cycle basis so that the system automatically transfers from the first to the second cycle and reverts to the first cycle at fixed intervals independently of the solids density in the loading chamber, so long as the pumping continues.

In an operating system according to our invention the solids are subjected to a minimum of abrasion or collision due either to their relative velocities with respect to each other, or with respect to fixed or moving parts. As no fluid jets are applied at any point, a minimum of turbulence is generated. By designing all pipes, flow passages and conduits of sufficiently large cross-sectional dimensions, substantially laminar flow of liquid and consequently very low vortex formation is achieved, with low shear forces. As the material is elevated in the intake tube, it is subjected to a small pressure drop below ambient atmospheric pressure, followed by rise of pressure as necessary to elevate the entrained material in the discharge conduit against any head.

Various types of valves may be employed in the suction and pressure branch lines, including sphincter valves operated by a gas such as air, for the highest speed operation with least agitation and impact of the solids. Unidirectional flow control valves associated in the load chamber adjacent the screen wall portions are preferably gate valves of disc type pivoting eccentrically of the tubular axis of the chamber, and arranged to be actuated solely by the application of suction or discharge pressures in the chamber.

It is therefore a chief object to be attained in putting our invention into practice, that an effective pumping apparatus may be realized for the movement of entrained solids and fluids by hydraulic or pneumatic means in which the solids are prevented from entering the pump and are subjected to a minimum of abrasion or buffeting.

It is also an object susceptible of attainment by the practice of our invention, that a pumping system will be provided by which a substantially continuous flow of liquid carrying entrained and/or suspended solids is drawn into an intake pipe of a valved tubular loading chamber and a substantially continuous discharge of water, or alternately water in which solids are entrained and/or suspended, issues from a discharge conduit.

A further and concomitant object which may be attained by the use of embodiments of our invention, is the realization of a transport conduit and pumping system as a unitary handling assembly including valves, valve operating gear and a high volumetric rate motor driven pump, all carried together as a rigid structure from an end of a parallelogram linkage provided with lowering means for immersing the intake pipe into a fish tank, and provided also with means to hoist the system into an elevated rest position clear of a dock or jetty when not in use.

Our invention may be the better understood as to its principles and practice by reference to the following description of its preferred embodiments, to be read in conjunction with the accompanying figures of the drawing, wherein:

FIGURE 1 is a perspective view showing a dockside installation of a hydraulic fish elevator in operation constructed according to the present invention;

FIGURE 2 is a schematic diagram of the operational elements of the apparatus shown in FIGURE 1;

FIGURE 3 shows the relationships of valves and flow states in the apparatus of FIGURE 2 in a first operating cycle, wherein sphincter valves are illustrated;

FIGURE 4 shows the relationship of valves and flow states in the apparatus of FIGURE 3 for an alternate cycle;

FIGURE 5 shows a vertical diametral cross section along the axis of the screen wall and check valve of the FIGURE 1 apparatus;

FIGURE 6 shows a side elevation view of a unitary support and positioning structure carrying the apparatus of FIGURE 1 in its lowered operating position; and, FIGURE 7 shows in reduced scale the apparatus of FIGURE 6 in its raised rest position.

Referring to the drawing, FIGURES 1 and 2, a hydraulic fish-handling pumping system comprises a generally horizontal elongate tubular loading chamber 10, having a suitably large diameter for the purpose, and having a length of at least several feet between perforated enclosed screen-wall portions 10A and 10B. The former is shown partly cut away in FIGURE 1 as the screen-wall lying nearest to a reservoir. The perforated portions are enclosed by respective tubular housings 11 and 12 providing annular spaces 11A, 12A extending the lengths of the respective screen walls and being closed at their ends by radial flange portions integral with the housings.

Suction branch lines 13, 14 are connected with the spaces 11A and 12A through the respective housings and join with a common pump suction line 15 leading to the intake side of a high volumetric capacity pump 16 driven by motor 17. Valves 18 and 19 respectively are fitted between each suction branch line and the pump suction line.

A flexible intake pipe 20 matching the diameter of tubular chamber 10 extends from the housing 11, and may range from about five to about twelve inches or more in diameter. A discharge conduit 21 extends from housing 12 at the other end of the loading chamber. This conduit is of similar diameter to that of chamber 10 and may be either flexible or rigid depending on the nature of the installation. For example where the product handled is distributed to various stations the line may be flexible while in a permanent dockside installation it may be made rigid, extending to a receiving point some distance away and elevated with respect to the rest of the system. As may be seen from FIGURE 6, such rigid line 21 may terminate at a separator discharging fish to a conveyor belt 51.

The intake pipe 20 has its open end immersed in a fluid storage container or reservoir such as a tank, or a ship's hold 22 as shown containing fish and water to be unloaded. The water level should lie within the lifting distance of pump 16, and should generally be less than twenty feet, preferably under ten feet. The output of pump 16 passes into a rigid pipe 23 under a pressure head at least as high as the hydraulic head needed to force water and fish up to a discharge point. Pipe 23 leads into pressure branches 24 and 25 which are connected with the loading chamber 10, through valves 26 and 27 respectively, at points on the sides of respective housings 11, 12 remote from the intake pipe 20.

Between each pressure branch line 24, 25 and the adjacent screen-wall portions 10A and 10B there are interposed check valves 28, 29 respectively, which permit flow only in the direction away from the intake pipe 20 toward the discharge conduit 21. The check valves may conveniently be combined with the discharge ends of branches 24, 25 so that flow of fluid under pressure in either of these branches is effective to close the associated check, while a small pressure difference between opposite faces of a closed valve suffices to open it.

A gas evacuating pump 30 driven by motor 31 applies suction to the common suction line 15 through manometric column 32, which is shown at less than its actual height. The column height above line 15 will be chosen so that substantially only the leg connected to the line will hold a column of water, whereby to withdraw gases only from the down leg which ascend from line 15 and which would otherwise adversely affect the operation of pump 16. The latter may be a centrifugal pump, while the pump 30 is preferably a vacuum pump capable of pulling a water column of at least twenty feet at sea level and of priming the intake line 15. Where pump 16 is a type effective to prime the system by its own operation, no auxiliary degassing pump will be needed.

The operation of the system will next be described, with reference also to FIGURES 3 and 4, assuming that the system is primed and that pump 16 is operating, the first cycle having commenced. Suction valve 18, pressure valve 26, and check 29 are closed and correspondingly functioning valves 19, 27, and 28 are open. Pressure in the intake pipe 20 is lowered, and atmospheric pressure forces water and entrained fish up along intake pipe 20, while water is withdrawn from the loading chamber through screen wall 10B into space 12A. The flow of water proceeds by way of suction branch line 14 to the pump intake. At the same time water is discharged under pressure from the pump outlet, flowing in pressure branch line 25 and along discharge conduit 21 to the delivery point.

As the pumping continues, loading chamber 10 partly fills with fish while water is continuously removed, eventually causing a pressure difference to be manifested at opposite sides of the screen-wall 10B. Suitable differential pressure responsive devices 33, 34, may be provided as shown in FIGURE 5, each being connected with opposite sides of respective screen walls 10A and 10B, to signal the increase of such pressure difference to a predetermined, changeover value. The control signal may be transmitted as by conductors 34A and 33A for use with automatic cycling controls, and/or may be indicated visibly or audibly in any manner so that manual attention may be given to the system. To initiate the second operating cycle the states of all valves must be reversed from those shown by FIGURE 3 to the states shown by FIGURE 4. Such reversal may be effected by operating manual control levers 18′, 19′, 26′, 27′, 28′ and 29′, shown in FIGURE 1. Such levers may be suitably paired for joint actuation as by the cable or chain linkages 35, 36 and 37, and may be connected with any form of controller unit 38 arranged to actuate all valves simultaneously so that respective members of a pair are always positioned in opposite states.

The controller 38 may be arranged for wholly manual operation, wholly automatic operation, or for any combination of manual with automatic service as the circumstances and kind of installation warrant. As illustrated by FIGURE 2, automatic operation of respective valves may also be arranged by individual operating mechanisms 118, 119, 126, 127, 128 and 129, which are arranged to be controlled jointly in groups from a master control (not shown) as those skilled in the art will readily comprehend. In any case, whether the change-over from the first to the second cycle or vice-versa is effected by human attendants, or automatically as at fixed time intervals, or by servo-mechanisms in response to the detection and signalling of conditions of congestion inside a screen-wall of the loading chamber, the valves 19, 25, and 28 are closed and valves 18, 26, and 29 are opened to initiate the second cycle.

In the second cycle water is withdrawn in line 13 through screen-wall 10A, thereby loading the interior thereof and possibly also loading part of the intake pipe 20 adjacent the screen wall with a higher concentration of fish bodies, while the pump discharges through pressure branch line 24 into the chamber 10 to expel its contents out along the length thereof and through discharge conduit 21.

The pumping system according to the invention is characterized by high speed and versatility, being adapted to handle a wide range of fluids and solids when suitably designed. In the system diagrammed in FIGURES 3 and 4, the same piping and conduits are employed as were described for FIGURES 1 and 2, except that sphincter valves are used throughout, and they are arranged to be actuated by a fluid pressure sub-system. Such sphincter valves are believed to be well known, generally comprising an external housing and a distensible internal sleeve providing, for one condition of the valve, an open passage through the sleeve, and in the alternate condition when the resilient sleeve wall is distended inward by application of fluid pressure between the housing and the sleeve, a radially constricted or wholly blocked passage. The internal sleeve wall members 218, 219, 226, 227, 228 and 229 may conveniently be formed as portions of a torus, using a durable rubber such as neoprene. One form of controller device suitable for actuating the valves comprises a fluid pump cylinder 38 in which a piston 39 reciprocates, to withdraw actuating fluid by way of port 40 and common line 41 connected with valves 19, 28 and 29 to open the sleeve passages, as shown in FIGURE 3, while forcing the actuating fluid under pressure through opposite port 42 along common line 43 to the housings of valves 18, 26 and 27 to close their sleeve passages. At the end of a cycle, the piston is driven to the other end to reverse the valves as shown by FIGURE 4. It will be understood that various other pump and actuator arrangements for the valves may be arranged and that the illustrated system would be equally workable if lines 41 and 43 were connected instead respectively by further valves (not shown) with sources of actuating fluid under pressure and with a means to withdraw such fluid, in a selectable manner.

It should be noted that the volumetric flow rate of the pump 16 remains substantially unchanged for either cycle, since a substantially uninterrupted and constant flow is maintained in intake pipe 20 as well as along discharge conduit 21. The flow along the loading chamber, i.e. between check valve 28 and screen-wall 10B will also be substantially constant, although the character of the material flowing during the first cycle will be a mixture of entrained fish and water, and will change during the second cycle to consist of substantially only water as the solids are flushed out of the loading chamber.

The action of the first screen-wall 10A is to pre-concentrate entrained material taken up through the intake pipe 20 during one cycle, while in the following cycle relatively concentrated material advances along the chamber 10 and contributes to the establishment of a pressure difference between the interior and exterior of screen-wall 10B as the solids move within it. The length of the loading chamber is therefore preferably made as long as the length of intake tube 20 to balance the cycles once the system is operating.

With high flow rates the system will alternate several times a minute when the distance between the screen-wall portions is about ten feet. The fish tank of a sixty ton vessel can be unloaded in a few minutes.

In the use of the relatively high speed system of our invention, the movement of a number of fishing vessels into a mooring and away therefrom, and the handling of the pumping equipment, will occupy the greater part of the total unloading time. It is therefore important to facilitate both the positioning of the pump intake into its operative position in a vessel's holds, and its removal therefrom. We therefore provide a rigid unitary assembly comprising the pump, loading chamber, and the necessary valves and conduits, as shown in FIGURES 6 and 7, wherein the system comprises the base of a triangular self-braced frame having as its hypotenuse the tension member 44, and having column 45 forming the vertical side of the right angle. The discharge conduit 21 is carried upward along the column to the separator 50, at which a screen 46 and collector trough 47 recieve the discharge from the end 48 of the conduit. The tension member 44 conveniently comprises a return tube fitted to drain the trough 47 to carry water back to the container 22, as by a hose 49.

The column 45 is supported from a pair of booms 52, 53, having their one ends 54, 55 pivoted in supports secured along a stout kingpost of mast 56 braced in the dock or jetty, and having their swinging ends 57, 58 pivotably joined at vertically spaced points along column 45. A cable 59 having an end secured adjacent the pivot support 58 passes over a guide pulley 60 on the upper end of mast 56, to a powered winch 61. By means of the winch, the parallelogram linkage comprising the parallel arms 52, 53 carrying column 45 may be actuated to raise or lower the latter as desired. In the lowered position depicted in FIGURE 6, the pumping system is brought nearly to deck level of a fishing vessel with the intake pipe 20 extended into the hold, while in the raised position of FIGURE 7 it will be seen that the entire system is clear of the dock allowing vessels to move into and away from the mooring.

While the foregoing description has particularly discussed embodiments of the invention for handling a mixture of fish and water, it is to be understood that a wide range of combinations of solids and fluids is envisaged for like handling by modified embodiments, including systems to a larger or smaller scale. For example, it is deemed obvious that other dispositions of screen-walls may be made, and that these may be provided with coarser or finer perforations, and that liquids other than water having densities either lower or higher than that of water may be selected for the entrainment or suspension of filtrable particulate solids. Moreover, the term "solids" herein is not restricted to rigid bodies, and may include vegetables, fruits, plant and animal products, and food products susceptible of entrainment. Minerals, fibers, and many products of the chemical, metallurgical, and industrial processing industries may likewise be handled. The entraining fluid may be a gas such as air or any suitable gas, including steam, vapours, and mixtures of gases and vapours, without departing from the teachings of the present invention.

We claim:

1. A materials handling system for transferring and transporting fluid-entrainable solids, comprising a fluid pump having intake and discharge lines, a horizontally elongate tubular loading chamber, spaced terminal screen-wall portions of said loading chamber being perforate to pass said fluid and substantially not pass said solids, an intake pipe and a discharge conduit respectively connected to ends of said screen wall portions, said intake pipe being adapted to connect with a mixture of solids in an entraining fluid volume, said loading chamber and said discharge conduit each having pressure branch conduits connected therewith at points adjacent respective screen wall portions, means to withdraw fluid selectively from said loading chamber, through either perforate wall portion and suction branch conduits into said intake line, means to discharge fluid under pressure through said discharge line selectively into a pressure branch nearest the selected fluid withdrawal point, and means to prevent reverse flow of fluid from respective pressure branches in a direction toward an adjacent screen wall portion.

2. A system as set forth in claim 1 wherein said means to withdraw fluid comprises a tubular housing enclosing and spaced from each screen-wall portion and having an associated suction branch conduit connected in communication with the space between said housing and said screen wall portion.

3. A system as set forth in claim 1 wherein said suction branch and said pressure branch conduits are each valved, and the valves are ganged for simultaneous change of state.

4. A system as set forth in claim 3 wherein said means to prevent reverse flow of fluid comprises a check valve in each of said loading chamber and said discharge conduit.

5. A system as set forth in claim 2 wherein pressure sensing means are provided in each tubular housing to signal a predetermined degree of obstruction of the screen-wall by solids, and valve means and valve actuator means are provided responsive to said predetermined degree of obstruction to effect said withdrawal and discharge of fluid by way of the other suction branch and pressure branch conduits.

6. A system as set forth in claim 3 comprising a unitary rigid structural assembly, in combination with a parallelogram support linkage for raising and lowering said system as a unit with said loading chamber held substantially in a horizontal position.

7. In a pumping system for transport of solids entrained in a fluid, the combination comprising a main conduit extended from a container of a mixture of solids and fluid to a discharge point, an intermediate portion of said main conduit being substantially horizontal and defining a loading chamber, said main conduit being perforated adjacent the ends of said chamber, said perforations forming a screen passing said fluid but not passing said solids, a pair of pressure branch conduits connected with said main conduit at points adjacent respective perforated portions and lying on the side thereof remote from said container for discharging fluid under pressure into said main conduit, fluid pumping means having an intake connected to said perforated portions by suction branch conduits and having a discharge connected with said pressure branches, a pair of check valves located in said main conduit between each said perforated portion and a respective adjacent pressure branch conduit, valve means in each pressure branch conduit and in each suction branch conduit, and means to alternately reverse the state of each valve and to operate valves of each pair in like functioning branch conduits in opposite states for continuously withdrawing mixed solids and fluid from said container into said main conduit and for alternately expelling fluid and mixed solids therefrom to said discharge point.

8. A pumping system as set forth in claim 7 wherein said valve means in said pressure branch and said suction branch conduits are sphincter valves.

References Cited by the Examiner
UNITED STATES PATENTS

| | | | |
|---|---|---|---|
| 2,672,370 | 3/1954 | Jones et al. | 302—14 |
| 2,672,372 | 3/1954 | Jones et al. | 302—14 |
| 2,749,187 | 6/1956 | Strom et al. | 302—14 |

HUGO O. SCHULZ, *Primary Examiner.*

ANDRES H. NIELSEN, *Examiner.*